No. 761,477. PATENTED MAY 31, 1904.
W. C. HABICHT.
BALL BEARING PULLEY.
APPLICATION FILED JAN. 25, 1904.

NO MODEL.

Witnesses:
S. John Williamson
G. Ferdinand Vogt.

Inventor:
William C. Habicht
By Mann & Co,
Attorneys.

THE NORRIS PETERS CO., PHOTO-LITHO., WASHINGTON, D. C.

No. 761,477. Patented May 31, 1904.

UNITED STATES PATENT OFFICE.

WILLIAM C. HABICHT, OF BALTIMORE, MARYLAND.

BALL-BEARING PULLEY.

SPECIFICATION forming part of Letters Patent No. 761,477, dated May 31, 1904.

Application filed January 25, 1904. Serial No. 190,429. (No model.)

*To all whom it may concern:*

Be it known that I, WILLIAM C. HABICHT, a citizen of the United States, residing at Baltimore, State of Maryland, have invented certain new and useful Improvements in Ball-Bearing Pulleys, of which the following is a specification.

My invention relates to an improved construction of ball-bearing pulley, and has for its object to provide a pulley of simple and durable construction the parts of which may be quickly assembled.

The invention is illustrated in the accompanying drawings, wherein—

Figure 1:
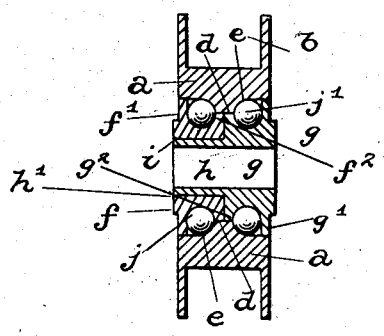
Figure 2:
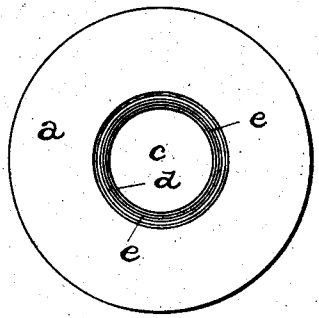
Figure 3:
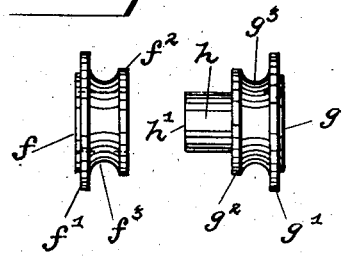
Figure 4:
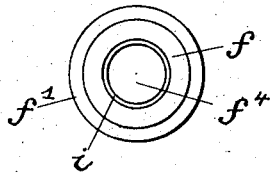

Figure 1 illustrates a vertical sectional view of a pulley provided with my improved construction. Fig. 2 illustrates a side elevation of the rim or body portion of the pulley. Fig. 3 illustrates a side elevation of the two parts which comprise the bushing portion of the pulley, and Fig. 4 shows an end elevation of one of said bushing parts.

In the drawings, $a$ designates the rim or body portion of the pulley having the usual circumferential channel or groove $b$ and also having a center opening $c$ and an interior circular flange $d$ in said opening. The opposite sides of this flange are each curved or rounded to form a recess $e$. A bushing fits into the center opening $c$ of the rim or body portion, and said bushing comprises two parts $f$ and $g$, each of which is provided with an exterior outer flange $f'$ and $g'$ and an interior annular flange $f^2$ and $g^2$. An annular channel $f^3$ and $g^3$ is provided with each of the bushing parts between the outer and inner flanges $f'$ and $f^2$ of one part and $g'$ and $g^2$ of the other part, and each of these annular channels $f^3$ and $g^3$ are semicircular in cross-section. The bushing part $f$ is also provided with a central opening $f^4$, and the mouth of said opening on the outer side (see Fig. 4) is provided with a beveled surface $i$.

The bushing part $g$ is provided with a circular hub-flange $h$, which projects laterally from the inner flange $g^2$, and said hub-flange passes through the opening $f^4$ of the bushing part $f$, and the face $h'$ of said hub-flange is turned over or riveted down against the beveled surface $i$ of the bushing part $f$ and the two parts secured together within the rim or body $a$. Two series of balls $j$ and $j'$ have position in the annular channels $f^3$ and $g^3$. When the two bushing parts are in position, the hub of one fitting within the other, the inner flanges $f^2$ and $g^2$ confront each other and the circumferential surface of said two flanges register with the central flange $d$ of the rim or body.

Having thus fully described my invention, what I claim as new, and desire to secure by Letters Patent, is—

1. A ball-bearing pulley having a body provided with an interior circular flange; a bushing comprising two parts each of which is provided with two flanges with an annular channel between said two flanges and also having means for securing the two parts together with their inner flanges confronting each other.

2. A ball-bearing pulley having a body provided with an interior circular flange; a bushing composed of two parts, each part of which has two flanges, one of which latter is smaller in diameter than the other, and the smaller flanges of each bushing part confronting each other and having position within the interior circular flange of the body and said bushing parts each also having an annular channel between its larger and smaller flanges.

In testimony whereof I affix my signature in the presence of two witnesses.

WILLIAM C. HABICHT.

Witnesses:
CHARLES B. MANN, Jr.,
G. FERDINAND VOGT.